United States Patent

[11] 3,558,146

[72] Inventors Dale Martin Mayers
912 Hollywood Place, West Palm Beach, Fla. 33405;
Duane D. Cook, 1126 Valley Road, Wayne, N.J. 07470;
[21] Appl. No. 718,139
[22] Filed Apr. 2, 1968
[45] Patented Jan. 26, 1971

[54] KEYLESS CHUCK
5 Claims, 5 Drawing Figs.
[52] U.S. Cl. .................................................. 279/28, 279/123
[51] Int. Cl. .................................................. B23b 31/19
[50] Field of Search .......................................... 279/1(K), 1(SG), 28, 33, 34, 60, 77, 106, 107, 123(O); 269/217

[56] References Cited
UNITED STATES PATENTS
2,215,621 9/1940 Slavik ............................. 279/1(K)UX
2,811,366 10/1957 Chasar ........................... 279/123

*Primary Examiner*—Andrew R. Juhasz
*Assistant Examiner*—Donald D. Evenson
*Attorney*—Morgan, Finnegan, Durham & Pine ABSTRACT: A keyless chuck assembly, wherein the chuck grips the tool shank solely as a result of the torque produced by the resistance of the workpiece to the turning movement of the chuck. In a first embodiment, the gripping members are preferably shaped in the form of a wedge which is laterally displaced by the torque against one side of the slot and simultaneously cammed into permanent gripping engagement with the cylindrical surface of the tool shank, the side of the slot serving as a stop for limiting the gripping pressure between the shank and the wedge. In a second embodiment, the gripping members are preferably shaped in the form of a triangle, the sides of which terminate opposite the base in a pair of opposed gripping ears. Either a clockwise or counterclockwise torque will laterally displace the second gripping member against one of the sides of the slot and simultaneously cam one of the gripping ears into permanent gripping engagement with the cylindrical surface of the tool shank. Each side of the slot serves as a stop for limiting the gripping pressure between the shank and the associated gripping ear of the triangular gripping member.

PATENTED JAN 26 1971

INVENTORS
DALE M. MAYERS
DUANE D. COOK
BY
Morgan, Finnegan, Durham & Pine
ATTORNEYS

INVENTORS
DALE M. MAYERS
DUANE D. COOK

KEYLESS CHUCK

BACKGROUND AND OBJECTS OF THE INVENTION

The present invention relates generally to chucks of utility especially in power drills and the like, and relates more particularly to a new and improved keyless chuck assembly of the type wherein the chuck grips a tool inserted therein solely as a result of the torque produced by the resistance of the workpiece to the turning movement of the chuck or tool.

It has previously been recognized that it is desirable to provide a chuck which will grip a tool without the use of a key or other manual tightening. However, all of these prior proposals have either not performed satisfactorily, or have required such a multiplicity of parts or such precision in the machining of the parts, as to be commercially impractical.

It is therefore an object of the present invention to provide a new and improved keyless chuck assembly.

Another object of the present invention is to provide a new and improved keyless chuck assembly which eliminates the disadvantages of previously known proposals for such assemblies.

Another object of the present invention is to provide a new and improved keyless chuck assembly which is characterized by its extreme simplicity of construction, so as to be capable of low-cost, commercially feasible fabrication, and yet which is capable of rugged, dependable, long term usage.

Another object of the present invention is to provide a new and improved keyless chuck assembly which permanently grips a tool with a predetermined amount of pressure solely as a result of the torque produced by the resistance of the workpiece to the turning of the tool shank.

Another object of the present invention is to provide a new and improved keyless chuck assembly which permanently grips a tool with a predetermined amount of pressure solely as a result of the torque produced by the resistance of the workpiece to the turning of the tool shank, irrespective of whether the torque is in a clockwise or counterclockwise direction.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention comprises a keyless chuck assembly, wherein the chuck grips the tool shank solely as a result of the torque produced by the resistance of the workpiece to the turning movement of the chuck or tool.

To this end, the gripping means of the chuck comprises elongated gripping members freely retained in an open slot which extends along the longitudinal inner edge of each of a plurality of jaws, the latter preferably arranged and operable in the manner of a conventional chuck assembly.

In a first embodiment, the gripping members are preferably shaped in the form of a right-angled wedge which is laterally displaced by the aforementioned torque against one side of the slot and simultaneously cammed into permanent gripping engagement with the cylindrical surface of the tool shank. Preselection of the angular disposition of the sides of the slot and the wedge determines the angle at which the line of applied force between the tool shank and the gripping wedge is directed. Preferably this line extends along the diagonal of the wedge and is at an angle of 5° to a line drawn normal to the tangent at the point where the wedge grips the shank.

In a second embodiment, the gripping members are preferably shaped in the form of a triangle, the sides of which terminate opposite the base in a pair of opposed gripping ears. Either a clockwise or counterclockwise torque will laterally displace the triangular gripping member against one of the sides of the slot and simultaneously cam one of the gripping ears into permanent gripping engagement with the cylindrical surface of the tool shank. Similarly to the first embodiment, by a particular selection of the angular disposition of the sides of the slot and the triangular gripping member, the line of applied force between the shank and the gripping member may be directed along a diagonal from one ear to the opposite edge of the base and at an angle of 5° to a line drawn normal to the tangent at the point where the gripping ear engages the surface of the cylindrical shank.

It will be understood that the foregoing general description and the following detailed description as well are exemplary and explanatory of the invention but are not restrictive thereof. Thus, while the improved chuck assembly of this invention is particularly adapted to and was designed for use in a power driven drill, the principles underlying the operation of the invention are not limited to such usage. However, since the invention is particularly adaptable to such usage, reference will be made hereinafter thereto in order to provide an example of a practical use for the invention.

The accompanying drawings, referred to herein and constituting a part hereof, illustrate preferred embodiments of the invention, and together with the description, serve to explain the principles of the invention.

DESCRIPTION OF THE PREFERRED EMBODIMENTS

Figure 1:
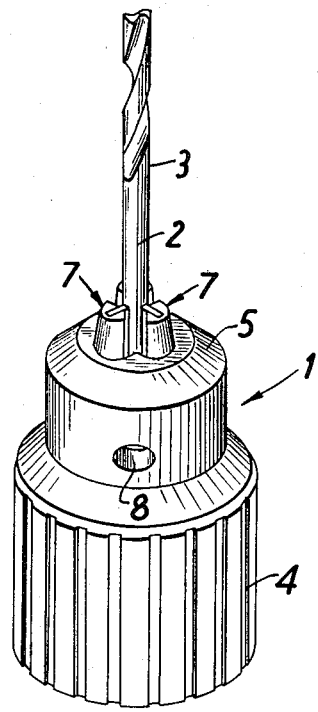
FIG. 1 is a persepective view illustrating a keyless chuck assembly constructed in accordance with the invention, the view showing the chuck gripping a drill bit.
Figure 2:
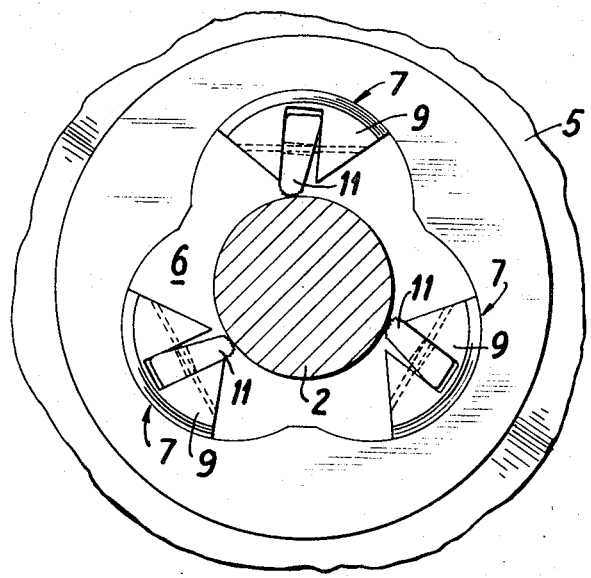
FIG. 2 is an enlarged, fragmentary top plan view, partly in section, of the chuck assembly of FIG. 1, the view illustrating the gripping members in a position immediately prior to their being placed into permanent gripping engagement with the drill bit shank.
Figure 3:
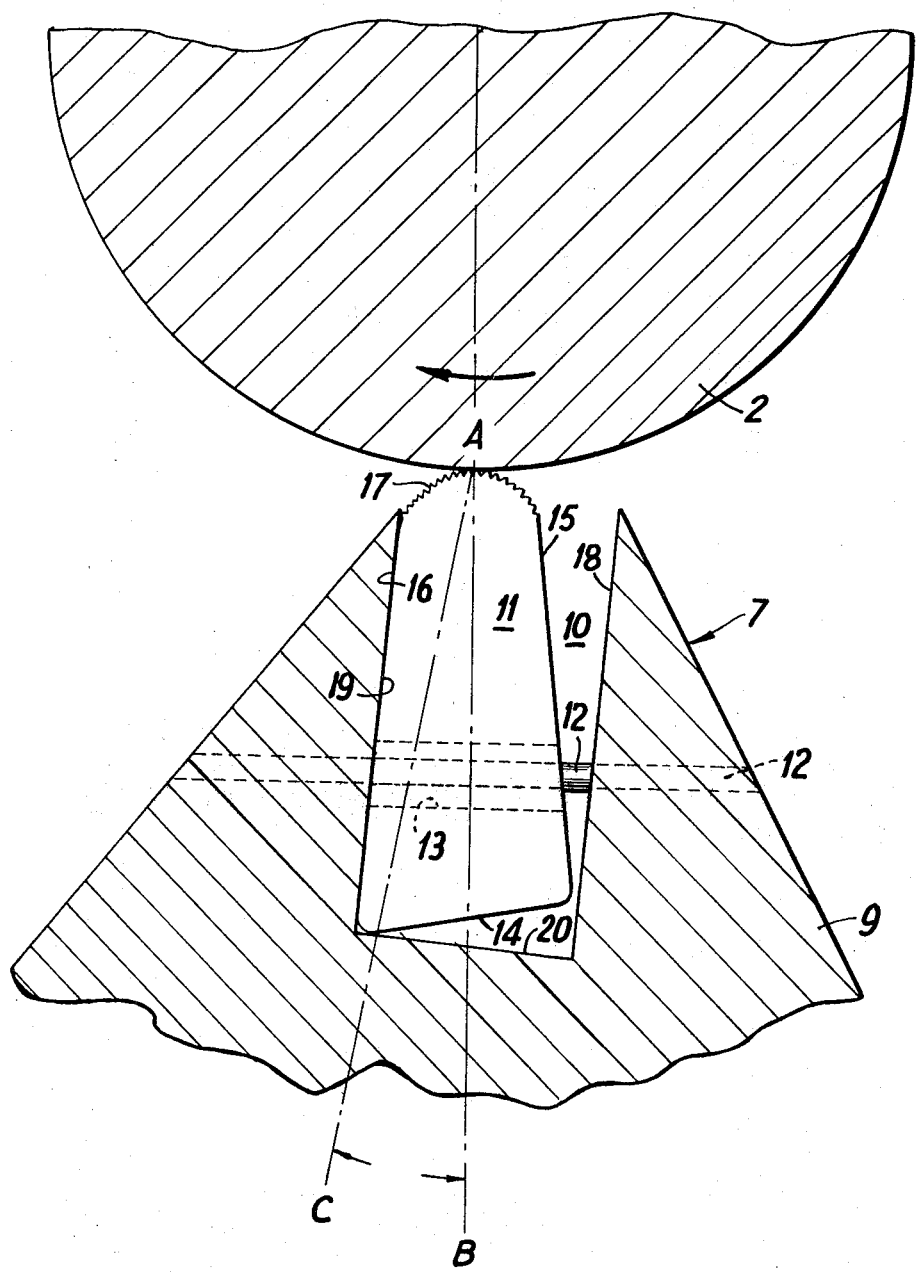
FIG. 3 is a greatly enlarged, fragmentary view, partly sectional and partly in top plan, illustrating a gripping member of the construction of FIG. 1 in permanent gripping engagement with the drill bit shank.

Referring now more particularly to FIGS. 1—3 of the accompanying drawings, there is shown a keyless chuck assembly in accordance with the invention, indicated generally by reference numeral 1, gripping the shank 2 of a suitable tool, such as drill bit 3.

Advantageously, the chuck body is of a conventional construction wherein the outer casing 4 telescopically receives therewithin a cylindrical block 5. The inner block 5 suitably includes an internally threaded bore at one end (not shown) for threaded engagement onto a power driven shaft of a drill or other tool (not shown), and an inwardly extending, outwardly tapered recess 6 at the other end for e telescopically slidably receiving therein a plurality of gripping means spaced at equal angular distances from each other about a common axis, each gripping means indicated generally by reference numeral 7. As here preferably embodied, block 5 contains a small lateral bore 8 in which the end of a suitable rod or bar (not shown) may be inserted to facilitate tightening of the chuck onto the tool shaft.

It will be understood that, as in the conventional manner, counterclockwise rotation of the outer casing 4 operates to project the gripping means 7 out of the recess 6 and to simultaneously bring the gripping means into contact with the shank 2. Conversely, clockwise rotation of the outer casing 4 operates to retract the gripping means 7 into the recess 6 and to simultaneously bring the gripping means out of contact with the shank 2.

In accordance with the invention, upon being brought into contact with the tool shank, each gripping means 7 of the chuck assembly is thereafter forced with a predetermined amount of pressure into permanent gripping engagement with the tool shank solely as a result of the torque produced by the resistance of the workpiece to the turning of the tool shank, without the use of a key or other manual tightening means.

To this end, in the embodiment illustrated in FIGS. 1—3, each jaw 9 of each gripping means 7 is provided with an open slot 10 extending along the longitudinal inner edge thereof, the open slot freely receiving therein an elongated gripping member 11, more fully described hereinafter. Suitable means is provided for retaining the member 11 in the slot 10 when the chuck assembly is not in use or during retooling operations and, as here preferably embodied, comprises one or more pins passing through an equal number of oversized, transverser boreholes formed in the gripping member, one such pin and hole being shown at 12 and 13, respectively.

As best seen in FIG. 3, the gripping member 11 is advantageously shaped in cross section in the form of a right-angled wedge so as to have a substantially flat base 14, a first longitudinally extending face 15 perpendicular to the base 14, and a second longitudinally extending face 16 disposed at an acute angle to the base 14 and the opposed face 16. The faces 15, 16 terminate in, and are separated by, a convex gripping edge 17 located generally opposite to the base 14. Advantageously, gripping edge 17 is arcuate in shape and serrated, as illustrated in FIG. 3. It will also be understood that the gripping edge 17 extends parallel to the common axis of the chuck body.

With particular reference now first to FIG. 2 and then to FIG. 3 of the accompanying drawings, it will be apparent from the foregoing that the operation of the gripping means 7 of the invention is as follows.

The shank 2 a suitable tool is inserted into the chuck assembly 1 and the outer casing 4 is then manually rotated, conventionally and as here preferably embodied, in a counterclockwise direction so as to project the jaws 9 of the gripping means 7 out of the inner block 5 and, hence, to bring the gripping members 11 into contact with the tool shank. At this point on of initial contact, it will be seen (FIG. 2) that the face 15 of the gripping member rests against the side 18 of the slot 10. It will be understood that in this position, the gripping members 11, although tightly contacting the tool shank, are not in permanent gripping engagement with the tool shank and would not hold the latter against resistance encountered during use.

Thereafter, upon beginning the drilling operation or other use, the torque produced by the resistance of the workpiece to the turning of the tool shank causes a clockwise force to be exerted on the gripping members, whereby the latter are laterally displaced until the faces 16 each are in flush engagement with the sides 19 of the slot 10. As the gripping members are laterally displaced, the gripping edges 17 simultaneously are cammed under pressure into permanent gripping engagement with the tool shank, since the lateral movement causes the line of applied force to shift to the diagonal axis of each of the gripping members, which is longer than the cross-sectional length of either of the faces 15, 16. Thus, the sides 19 of slots 10 serve as stop means for limiting the lateral displacement of the gripping members 11 and, consequently, the pressure exerted between the tool shank and the gripping members.

It will be apparent from the foregoing that, by disposing the side 19 of slot 10 at a particular, selected angle to a line AB drawn normal to the tangent of the cylindrical surface of the tool shank 2 at the point A where the gripping edge 17 permanently grips the shank, the line of applied force, AC, between the tool shank 2 and the gripping member 11 may be directed along a predetermined angle to the line AB, and a predetermined amount of pressure may thereby be applied to the tool shank by the gripping member. It will also be apparent that the longitudinal face 16 of the gripping member 11 is advantageously disposed at an angle to the base 14 so that, when laterally displaced so as to rest flush against the side 19 of slot 10, the line of applied force AC passes along the diagonal axis of the wedge 11. Finally, it will be understood that the bore holes 13 are sufficiently oversized so as to permit the wedge 11 to be laterally displaced until its face 16 is in flush contact with side 19 of the slot 10.

It has been found that the angle of the line of applied force AC to the line AB may suitably range from approximately 1° to 15°. When the diameter of the tool shank is in the range of one-sixteenth - one-half inch, highly satisfactory results have been achieved at 5° and it is preferred that the line of applied force be directed at that angle.

It will be understood to those skilled in the art that the relation between the angular disposition of the sides and bottom of the slot 10 and that of the faces and base of the gripping member 11 are interdependent and may be varied as desired in order to achieve a line of applied force passing along the diagonal of the gripping member and at the desired angle to the point of gripping engagement. However, it has been found advantageous for ease of machining, with the preferred shape of the gripping member 11 depicted in FIG. 3 and previously described, to form the longitudinally extending sides 18, 19 of slot 10 substantially parallel to one another and, in turn, substantially perpendicular to the bottom 20 of the slot.

Figure 5:
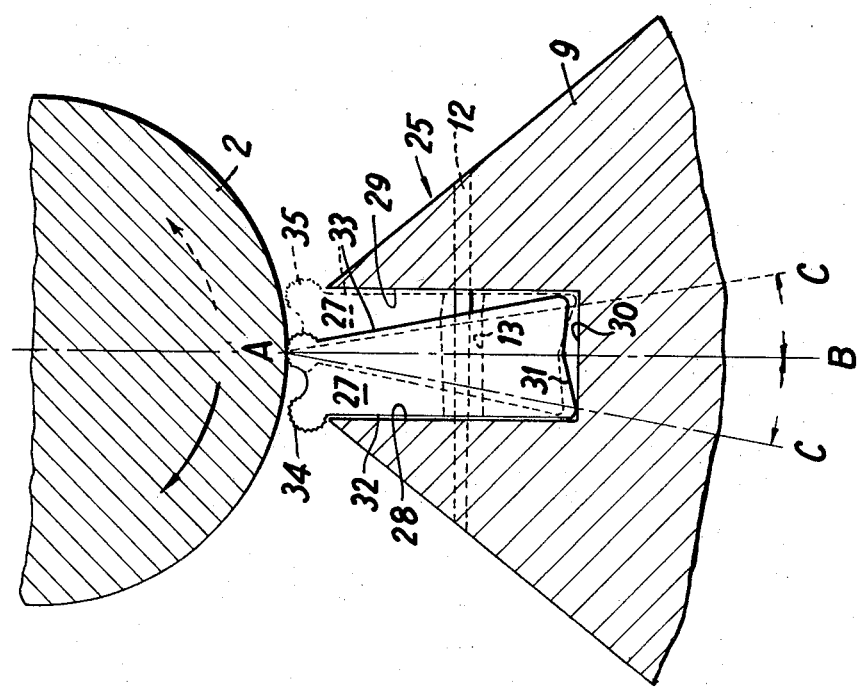
FIG. 5 is a view similar to that of FIG. 4, illustrating, in solid lines, the gripping member in a first "forward" permanent gripping position with the drill bit shank and, in dotted lines, the gripping member in a second "reverse" permanent gripping position with the drill bit shank.
Figure 4:
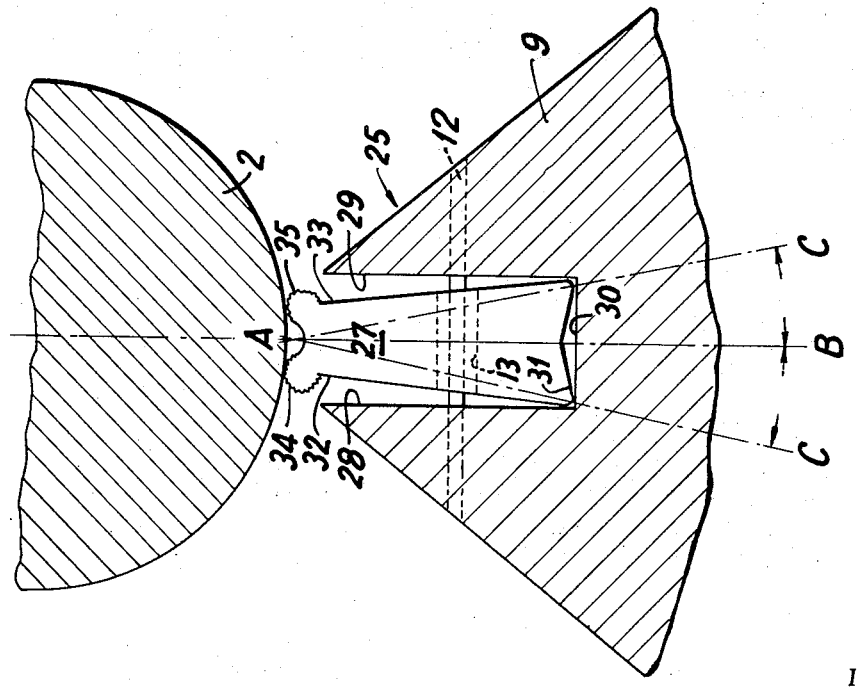
FIG. 4 is a greatly enlarged, fragmentary view, partly sectional and partly in top plan, illustrating another embodiment of a gripping member for the chuck assembly shown in FIG. 1 in accordance with the invention, the view showing the gripping member in a position immediately prior to its being placed into permanent engagement with the drill bit shank.

Referring now more particularly to FIGS. 4—5 of the accompanying drawings, there is shown an alternate embodiment of a gripping means in accordance with the invention, indicated generally by reference numeral 25, for a keyless chuck assembly such as that shown in FIG. 1. In this embodiment, the gripping means 25 is adapted to be forced with a predetermined amount of pressure into permanent gripping engagement with a tool shank solely as a result of the torque produced by the resistance of a workpiece to the turning of the tool shank, irrespective of whether the direction of the torque is clockwise or counterclockwise. It will be understood that this embodiment is highly advantageous for use in applications requiring both "forward" and "reverse" directions of rotation such as, for example, where the tool held by the chuck is a screwdriver.

To this end, similarly to the previous embodiments, each jaw 9 of each gripping means 25 is provided with an open slot 26 extending along the longitudinal inner edge thereof, the open slot freely receiving therein an elongated gripping member 27, more fully described hereinafter. Advantageously, the gripping member 27 is retained in slot 26 in the same manner as that described in the previous embodiment, and, accordingly, a typical pin member is shown at 12 passing through a typical oversized, transverse borehole 13 extending through the gripping member. The slot 26 is advantageously provided with longitudinally extending sides 28, 29 substantially parallel to one another and, in l turn, substantially parallel to one another and, in turn, substantially perpendicular to the bottom 30 of the slot.

As perhaps best seen in FIG. 4, the gripping member 27 is advantageously shaped in cross section in the form of a triangle. and includes a base 31 and opposed, longitudinally extending faces 32, 33. The faces 32, 33 terminate at their ends opposite to base 31 in a pair of opposed ears 34, 35 which from gripping edges. It will thus be seen that the gripping member 27 includes two diagonal axes, each of which extends from a gripping ear to the opposite edge of the base 31 and each of which is longer than the cross-sectional length of the faces 32, 33. Advantageously, each of the ears 34, 35 are arcuate and serrated, as illustrated in FIGS. 4—5. Also, it will be understood that the gripping edges of ears 34, 35 extend parallel to the common axis of the chuck body.

The operation of the gripping means 25 is similar to that of gripping means 7 and, briefly, is as follows.

With reference to FIG. 4, the gripping means 25 is shown after the chuck assembly has been manually rotates so as to initially contact the gripping members 27 with the tool shank with a force sufficient to prevent the tool from falling out to of the chuck but insufficient to hold the tool during usage. With reference to FIG. 5, and to the solid lines thereof, the gripping member 27 is shown after having been laterally displaced by the torque produced as a result of a clockwise resistance encountered during usage. Hence, the face 32 rests in flush engagement against the side 28 of slot 26, and the gripping ear 35 is cammed into permanent gripping engagement with the cylindrical surface of the tool shank. The line of applied force AC passes along the diagonal axis extending from the ear 35 to the opposite edge of the base 31 of the gripping member. With respect to the dotted line illustration in FIG. 5, the gripping means 27 is shown after having been laterally displaced by a torque produced as a result of a counterclockwise resistance encountered during usage. Hence, the opposite face 33 now is in flush contact with the side 29 of slot 26 and the line of applied force AC passes along the diagonal axis extending between the gripping ear 34 and the opposite edge of the base 31 of the gripping member.

It will be understood from the foregoing that, as explained in connection with the previous embodiment, the relation between the angular disposition of the sides 28, 29 of slot 26 and that of the faces 32, 33 of the gripping member 27 are interdependent and may be varied as desired in order to achieve the positioning of the line of applied force along either of the diagonal axes of the gripping member and at the desired angle to the point of gripping engagement.

Accordingly, the invention in its broader aspects is not limited to the specific embodiments herein shown and described but departures may be made therefrom within the scope of the accompanying claims, without departing from the principles of the invention and without sacrificing its chief advantages.

We claim:

1. In a keyless chuck assembly having a plurality of gripping means located at equal angular distances from each other about a common axis and adapted to grip a tool shank inserted therein along said axis, the improvement therein which comprises:

each of said gripping means including a jaw simultaneously movable both longitudinally and transversely of said common axis, axis;

said jaw having an open slot extending longitudinally of its inner edge parallel to said common axis;

a gripping member mounted in said open slot for free movement laterally of said common axis adapted to engage and permanently grip said tool shank solely as a result of being laterally displaced by the torque produced by the resistance of a workpiece to the turning movement of the tool shank;

said gripping member is formed in the general shape of an elongated triangle, said triangle including:
   a base;
   a pair of opposed, longitudinally extending faces terminating opposite said base in a pair of opposed, longitudinally extending gripping ears, each of said gripping ears having a gripping edge parallel to said common axis;
   a pair of diagonal axes extending between said gripping ears and a portion of said base longer than the cross-sectional length of either of said faces; whereby said gripping member is cammed into permanent gripping engagement with said tool shank upon being laterally displaced in either a clockwise or counterclockwise direction by said torque, one of said gripping ears engaging and gripping said tool shank upon clockwise displacement of said gripping member and the other of said ears engaging and gripping said tool shank upon counterclockwise displacement of said gripping member; and stop means for limiting the lateral displacement of said gripping member so that a predetermined amount of pressure is exerted between said tool shank and said gripping member when they are in permanent gripping engagement, said stop means comprising both sides of said slot, one side of said slot serving to locate said one gripping ear upon clockwise displacement of said gripping member and the other side of said slot serving to locate said other of said gripping ears upon counterclockwise displacement of said gripping member.

2. A keyless chuck assembly as claimed in claim 1, wherein the angle between the respective sides of said slot and faces of said triangular gripping member is determined so that the pressure exerted between said tool shank and the respective gripping ears of said gripping member when in permanent gripping engagement is directed along a line at a predetermined angle to a line drawn normal to the tangent at the point where said respective gripping ears permanently engage said tool shank.

3. A keyless chuck assembly as claimed in claim 2, wherein the longitudinally extending faces of said gripping member are disposed at an angle to the respective sides of the slot so that when in permanent gripping engagement the pressure exerted between the tool shank and the respective gripping ears is directed along one of said diagonal axes of said gripping member.

4. A keyless chuck assembly as claimed in claim 2, wherein said predetermined angle is between 1°—15°.

5. A keyless chuck assembly as claimed in claim 4, wherein said predetermined angle is 5°.